US009482362B2

(12) United States Patent
Lee et al.

(10) Patent No.: US 9,482,362 B2
(45) Date of Patent: Nov. 1, 2016

(54) CHECK VALVE FOR INJECTING GAS

(71) Applicant: HYUNDAI HEAVY INDUSTRIES CO., LTD., Ulsan (KR)

(72) Inventors: Dae-jin Lee, Ulsan (KR); Dae-yeoul Jung, Ulsan (KR); Sung-hyeok Kim, Ulsan (KR); Kwang-cheol Heo, Ulsan (KR); Jong-suk Kim, Ulsan (KR)

(73) Assignee: HYUNDAI HEAVY INDUSTRIES CO., LTD. (KR)

( * ) Notice: Subject to any disclaimer, the term of this patent is extended or adjusted under 35 U.S.C. 154(b) by 69 days.

(21) Appl. No.: 14/374,970

(22) PCT Filed: Dec. 21, 2012

(86) PCT No.: PCT/KR2012/011265
§ 371 (c)(1),
(2) Date: Jul. 28, 2014

(87) PCT Pub. No.: WO2013/122318
PCT Pub. Date: Aug. 22, 2013

(65) Prior Publication Data
US 2015/0001430 A1    Jan. 1, 2015

(30) Foreign Application Priority Data

Feb. 13, 2012  (KR) .................. 10-2012-0014407
Feb. 13, 2012  (KR) .................. 10-2012-0014408

(51) Int. Cl.
*F01L 3/00*    (2006.01)
*F16K 27/02*   (2006.01)
(Continued)

(52) U.S. Cl.
CPC ........... *F16K 31/485* (2013.01); *F02B 19/108* (2013.01); *F02B 19/12* (2013.01);
(Continued)

(58) Field of Classification Search
CPC . F01L 3/20; F02M 21/0242; F02M 21/0251; F02M 21/0269; F16K 27/02; F16K 27/0209
USPC .............. 123/188.2, 188.3, 188.17; 251/322, 251/323; 239/533.11, 584
See application file for complete search history.

(56) References Cited

U.S. PATENT DOCUMENTS 1,828,792 A * 10/1931 Tverbakk .................. F01L 1/28
                                                        123/445
2,035,203 A *  3/1936 Smith ..................... F02M 61/08
                                                        239/452
(Continued)

FOREIGN PATENT DOCUMENTS

DE    102008059865    6/2010
JP      60104752      6/1985
(Continued)

OTHER PUBLICATIONS

Japanese Office Action—Japanese Application No. 2014-554656 issued on Jul. 13, 2015, citing JP 2001-82254, JP 4-171256, JP 2005-315177 and JP 2009-264255.
(Continued)

*Primary Examiner* — Marina Tietjen
*Assistant Examiner* — Seth W MacKay-Smith
(74) *Attorney, Agent, or Firm* — Cantor Colburn LLP

(57) ABSTRACT

A check vale for injecting fuel comprises: an integrally formed body provided with a neck-down portion having a diameter smaller than other areas on an outer surface of an upper portion of a fuel flow hole; an integrally formed spindle perpendicularly penetrating the body and provided with a neck-down portion having a diameter smaller than other areas on an outer surface of a lower portion of the fuel flow hole of the body; a spring surrounding an upper end portion of the spindle; a spring seat for fixing the spring surrounding the upper end portion of the spindle and for guiding the spindle to a perpendicular position; a coupling ring coupled to an upper end of the body for fixing the body to a prechamber; and a spacer coupled to a lower end of the body for fixing the lower end of the body that covers an outer edge of the spindle to the prechamber.

7 Claims, 9 Drawing Sheets

(51) Int. Cl.
*F02M 61/10* (2006.01)
*F16K 31/48* (2006.01)
*F02M 21/02* (2006.01)
*F02B 19/10* (2006.01)
*F02B 19/12* (2006.01)
*F02M 61/20* (2006.01)
*F16K 3/24* (2006.01)
*F16K 31/44* (2006.01)
*F01L 3/08* (2006.01)

(52) U.S. Cl.
CPC ..... *F02M21/0242* (2013.01); *F02M 21/0251* (2013.01); *F02M 21/0269* (2013.01); *F02M 21/0275* (2013.01); *F02M 61/20* (2013.01); *F16K 3/24* (2013.01); *F16K 31/44* (2013.01); *F01L 3/08* (2013.01); *F16K 27/0209* (2013.01); *Y02T 10/125* (2013.01); *Y02T 10/32* (2013.01)

(56) References Cited

U.S. PATENT DOCUMENTS

| | | | | |
|---|---|---|---|---|
| 2,177,779 A * | 10/1939 | McDonald | ............. | F23D 11/24 137/454.5 |
| 2,503,186 A * | 4/1950 | Ziegler | ............. | F02M 67/12 123/264 |
| 2,521,224 A * | 9/1950 | Kammer | ............. | F02M 45/08 239/88 |
| 2,799,255 A * | 7/1957 | Gehres | ............. | F02B 43/00 123/1 R |
| 2,921,746 A * | 1/1960 | Burman | ............. | B05B 1/32 239/453 |
| 3,095,153 A * | 6/1963 | Soth | ............. | F23D 11/26 239/403 |
| 3,224,684 A * | 12/1965 | Roosa | ............. | F02M 55/02 239/453 |
| 3,409,225 A * | 11/1968 | Maddalozzo | ............. | F02M 57/021 239/533.9 |
| 3,466,009 A * | 9/1969 | Giles | ............. | F01L 3/10 123/188.2 |
| 3,479,007 A * | 11/1969 | Buell | ............. | F01L 1/12 123/188.2 |
| 3,591,081 A * | 7/1971 | Andre | ............. | F23D 11/24 239/101 |
| 4,014,472 A * | 3/1977 | Bennett | ............. | B67C 3/2614 141/392 |
| 4,180,030 A * | 12/1979 | McWhirter | ............. | F01L 3/10 123/188.17 |
| 4,306,681 A * | 12/1981 | Laitio | ............. | F02M 57/021 239/533.3 |
| 4,365,756 A * | 12/1982 | Fisher | ............. | B05B 1/323 239/533.2 |
| 4,519,372 A | 5/1985 | Hoffman | | |
| 4,693,424 A * | 9/1987 | Sczomak | ............. | F02M 61/08 239/453 |
| 4,750,675 A * | 6/1988 | Sczomak | ............. | B05B 1/323 239/453 |
| 4,813,600 A * | 3/1989 | Shultz | ............. | F02M 53/04 239/125 |
| 4,865,001 A * | 9/1989 | Jensen | ............. | F02D 19/105 123/27 GE |
| 5,285,756 A * | 2/1994 | Squires | ............. | F02M 57/023 123/294 |
| 5,346,136 A * | 9/1994 | Bassett | ............. | F01L 3/085 239/533.2 |
| 6,113,011 A * | 9/2000 | Potz | ............. | F02M 61/045 239/453 |
| 6,170,757 B1 * | 1/2001 | Herrmann | ............. | F02M 61/08 239/124 |
| 6,340,017 B1 * | 1/2002 | Dick | ............. | F02M 51/0603 123/467 |
| 6,375,158 B1 * | 4/2002 | Kramer | ............. | F01L 3/10 251/336 |
| 7,216,632 B2 * | 5/2007 | Nagatomo | ............. | F02M 45/086 123/300 |
| 7,934,669 B2 | 5/2011 | Schurz et al. | | |
| 8,166,953 B2 * | 5/2012 | Caley | ............. | F02D 41/20 123/490 |
| 8,800,895 B2 * | 8/2014 | Hicks | ............. | F23D 11/38 239/533.2 |
| 2008/0296415 A1* | 12/2008 | Biagetti | ............. | F02M 61/08 239/584 |

FOREIGN PATENT DOCUMENTS

| | | |
|---|---|---|
| JP | 04171256 | 6/1992 |
| JP | 11303708 | 11/1999 |
| JP | 2001082254 | 3/2001 |
| JP | 2005315177 | 11/2005 |
| JP | 2007537391 | 12/2007 |
| JP | 2009526157 | 7/2009 |
| JP | 2009264255 | 11/2009 |
| KR | 1020110053048 | 5/2011 |
| KR | 1020110053050 | 5/2011 |

OTHER PUBLICATIONS

International Search Report—PCT/KR2012/011265 dated Mar. 13, 2013.
European Search Report—European Application No. 12868583.1, issued on Dec. 11, 2015, citing U.S. Pat. No. 4,519,372, U.S. Pat. No. 4,365,756 and DE 10 2008 059865.

* cited by examiner

CHECK VALVE FOR INJECTING GAS

TECHNICAL FIELD

The present invention relates to a check valve for injecting fuel, and more particularly, to a check valve for injecting fuel, which enables smooth injection of fuel, improved productivity by allowing quick and simple disassembly and assembly, an increased usage life by providing enhanced durability by means of minimizing abrasion of main parts, and prevention of backflow of uncombusted fuel.

BACKGROUND ART

Fuel injection is performed in a precombustion chamber of a gas engine in accordance with an operation of a check valve for injecting fuel.

In this case, types of the check valve for injecting fuel include a ball type, a plate type, and a poppet type. These types of the check valve for injecting fuel are selectively applied according to conditions due to their advantages or disadvantages.

Combustion of fuel having a heavy mixed concentration in which air and fuel are mixed with each other near a theoretical air-fuel ratio, is performed so that carbon can be generated.

In this case, since carbon is fixed to the check valve for injecting fuel, opening/closing of the check valve is not smoothly performed, or opening/closing of the check valve itself is not performed.

For this reason, a poppet type check valve that is known to have a comparatively strong tolerance with respect to carbon, is mainly used in the gas engine.

In this case, the check valve used in the gas engine may be maintained at an appropriate durability to be driven in a high-temperature and high-pressure environment.

Meanwhile, a poppet type check valve 100' according to the related art will now be described in detail.

As illustrated in FIGS. 1 and 2, the poppet type check valve 100' according to the related art is combined with a prechamber 300 with a thread 116 formed at an upper end of a body 110'.

In this case, since a check valve mounting portion in which a lower end of the body 110' of the check valve 100' and the prechamber 300 contact each other, is sealed with a coupling force generated by thread engagement, high-temperature, uncombusted fuel can be prevented from flowing backward, as illustrated in FIG. 2.

However, since the check valve mounting portion is narrow, even when the check valve 100' is installed to be slightly twisted, a gap is formed in a check valve seat portion in which the body 110' of the check valve 100' and a circumference of a lower end of a spindle 120' contact each other, such that uncombusted fuel may flow backward through the gap.

In the poppet type check valve 100' according to the related art, carbon generated in uncombusted fuel may be fixed to the spindle 120' in accordance with flow of uncombusted fuel.

Also, in the poppet type check valve 100' according to the related art, the body 110' and the spindle 120' are combined with each other using several parts so that it takes a long time to perform disassembly and assembly and thus productivity of the poppet type check valve 100' is lowered.

In the poppet type check valve 100' according to the related art, since the spindle 120' is eccentrically lowered and slantly comes into contact with the body 110', a one-sided abrasion phenomenon in which abrasion is concentrated on a guide portion between the spindle 120' and the body 110' and the check valve seat portion, occurs, and thus durability of the poppet type check valve 100' is lowered.

DISCLOSURE

Technical Problem

The present invention is directed to providing a check valve for injecting fuel, which enables prevention of backflow of uncombusted fuel, improved productivity by allowing quick and simple disassembly and assembly, and enhanced durability against one-sided abrasion of a spindle.

Technical Solution

One aspect of the present invention provides a check valve for injecting fuel, including: an integrally formed body provided with a neck-down portion having a diameter smaller than other areas on an outer surface of an upper portion of a fuel flow hole; an integrally formed spindle which perpendicularly penetrates the body, and is provided with a neck-down portion having a diameter smaller than other areas on an outer surface of a lower portion of the fuel flow hole of the body; a spring which surrounds an upper end portion of the spindle; a spring seat for fixing the spring surrounding the upper end portion of the spindle and for guiding the spindle to a perpendicular position; a coupling ring, which is coupled to an upper end of the body, for fixing the body to a prechamber; and a spacer, which is coupled to a lower end of the body, for fixing the lower end of the body that covers an outer edge of the spindle to the prechamber.

A short jaw may be formed on an outer surface of each of an upper end portion and a lower end portion of the body.

An O-ring may be provided in the upper end portion of the spindle to contact an inner surface of a through hole of the body.

The spring seat may be coupled to the spindle by coupling a split ring.

A thread may be formed on an outer surface of the coupling ring.

A lower end of the spacer may be placed at a lower portion than a lower end of the spindle.

Effects of the Invention

As described above, in a check valve for injecting fuel according to the embodiment of the present invention, since a neck-down portion is provided on each of an outer surface of a body and an outer surface of a spindle, the neck-down portion on the outer surface of the body provides a fuel flow space so that fuel injection can be smoothly performed.

Also, in the check valve for injecting fuel according to the embodiment of the present invention, the body and the spindle are individually integrally formed so that the number of parts can be minimized, disassembly and assembly can be conveniently performed with a short time and productivity can be improved.

In addition, in the check valve for injecting fuel according to the embodiment of the present invention, deformation of a lower end portion of the body is prevented by a spacer so that uncombusted fuel can be prevented from flowing backward due to deformation of the lower end portion of the body.

Furthermore, the check valve for injecting fuel according to the embodiment of the present invention is supported and driven through an outer surface of a spring seat and an inner surface of a coupling ring so that friction between members of the check valve can be reduced and durability can be enhanced.

BEST MODE OF THE INVENTION

Hereinafter, exemplary embodiments of the present invention will be described in detail.

Figure 1:
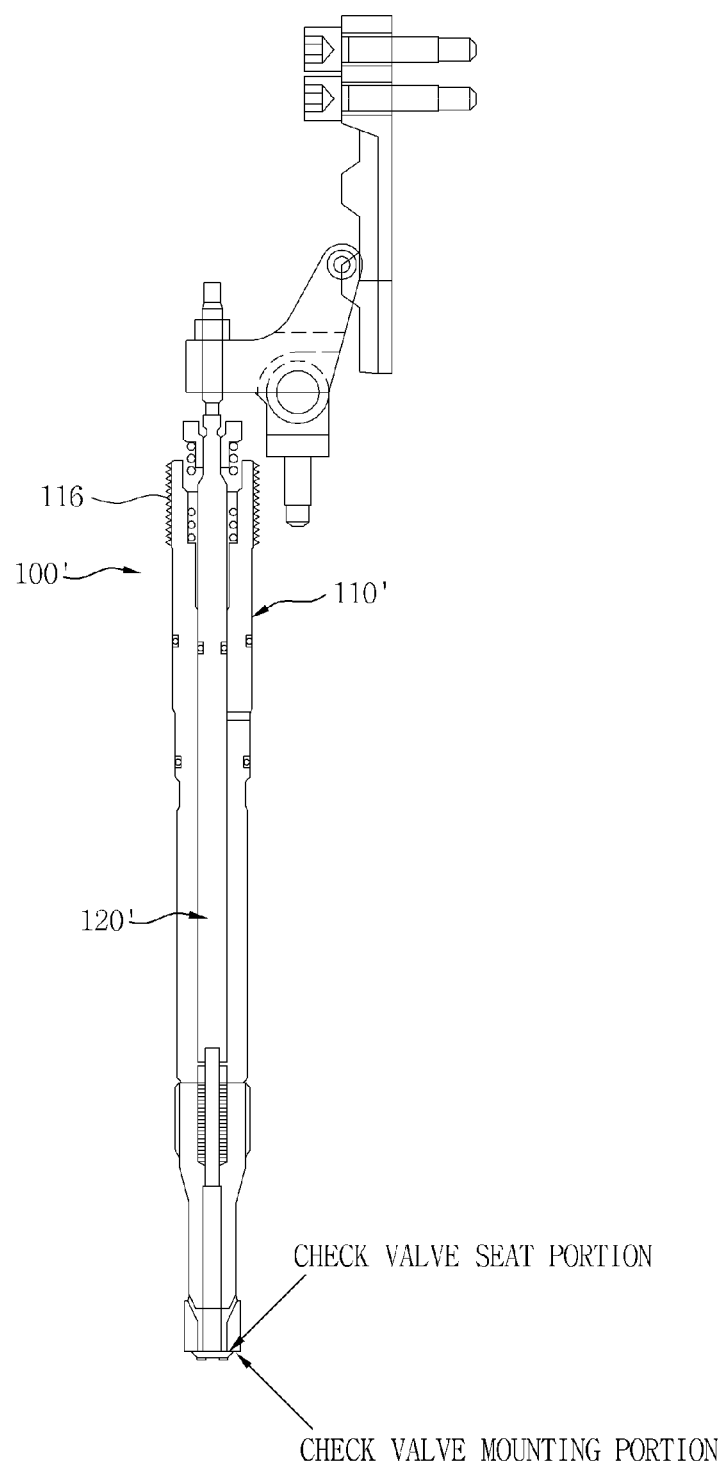
FIG. 1 is a cross-sectional view of a structure of a poppet type check valve according to the related art.
Figure 2:
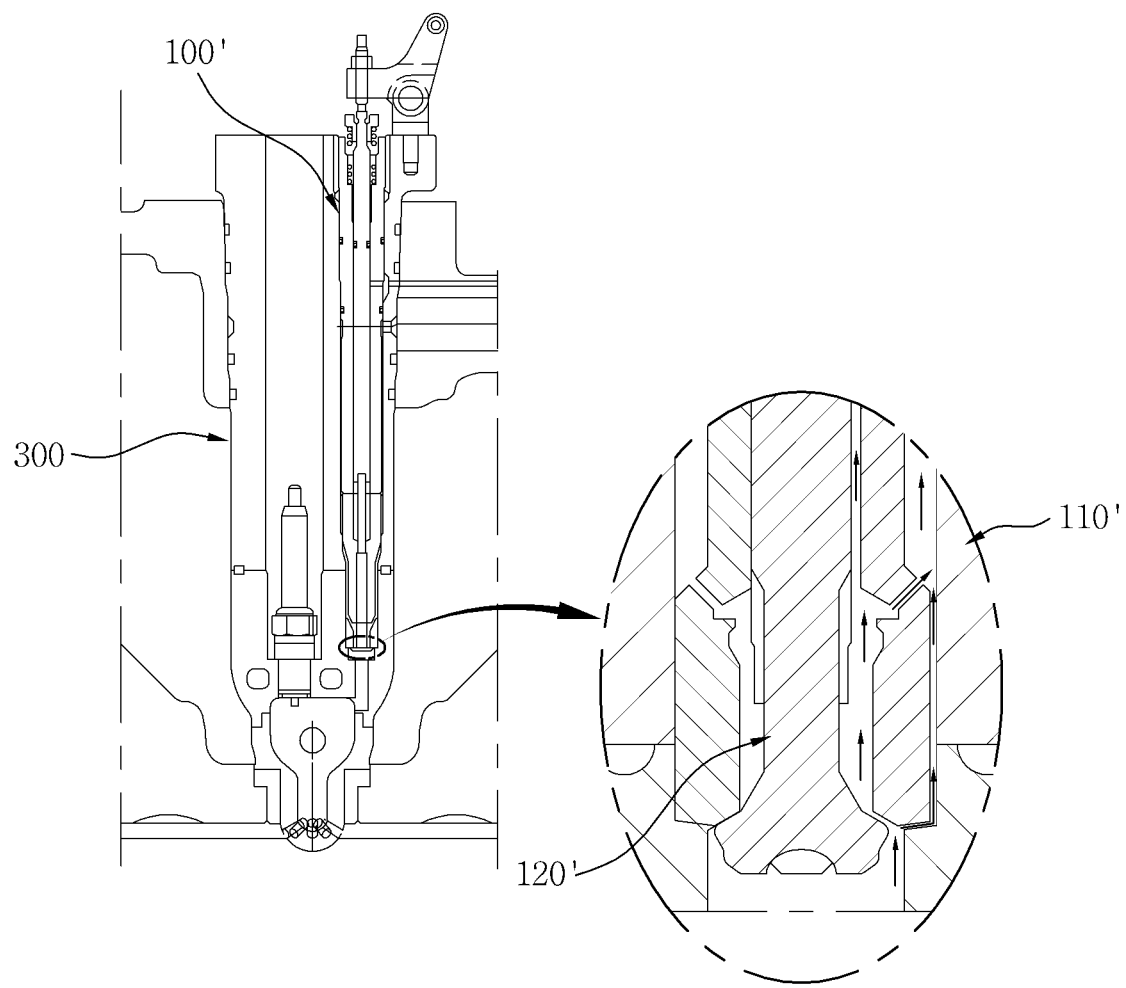
FIG. 2 illustrates backflow of uncombusted fuel in the poppet type check valve illustrated in FIG. 1.
Figure 3:
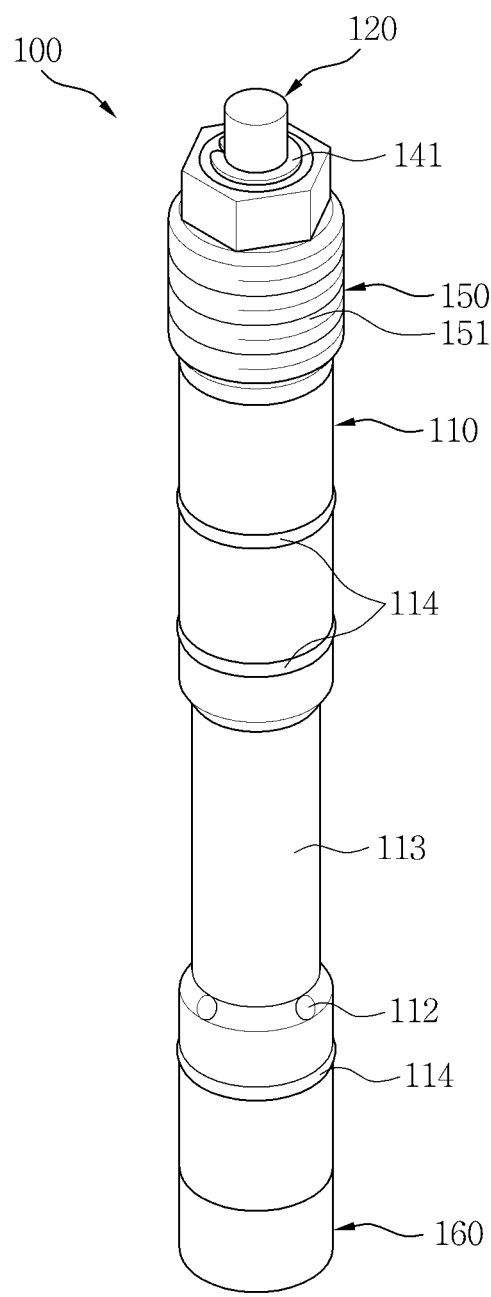
FIG. 3 is a perspective view of an exterior of a check valve for injecting fuel according to an embodiment of the present invention.
Figure 4:
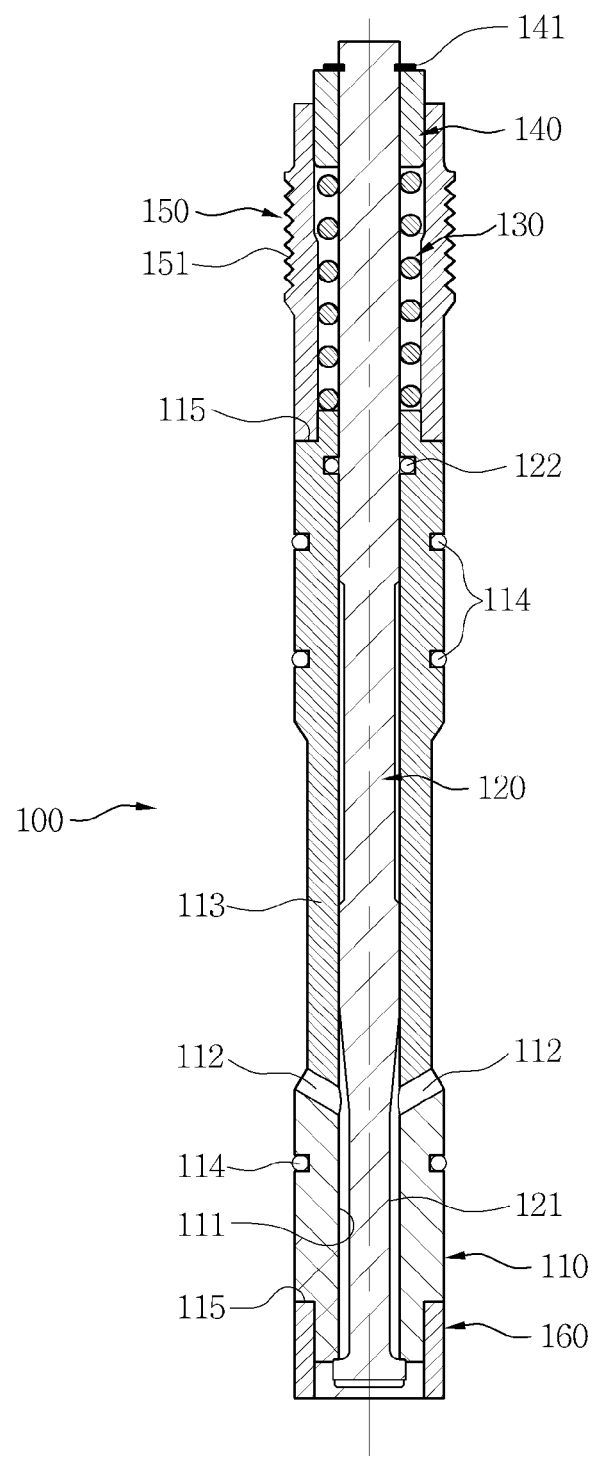
FIG. 4 is a cross-sectional view illustrating a coupled state for describing a structure of the check valve for injecting fuel illustrated in FIG. 3.

As illustrated in FIGS. 3 and 4, a check valve 100 for injecting fuel according to an exemplary embodiment of the present invention includes a body 110, a spindle 120, a spring 130, a spring seat 140, a coupling ring 150, and a spacer 160.

The body 110 includes a neck-down portion 113 that is provided on an outer surface of an upper portion of a fuel flow hole 112 and has a smaller outer diameter than diameters of other portions.

The body 110 may be integrally formed.

The body 110 is integrally formed so that the number of parts can be minimized.

The fuel flow hole 112 of the body 110 may extend in all directions.

The fuel flow hole 112 of the body 110 extends in all directions so that fuel inflow through the fuel flow hole 112 can be uniformly performed regardless of a direction.

A sealing 114 may be continuously coupled to an outer surface of the body 110 at vertical intervals.

The sealing 114 is continuously coupled to the outer surface of the body 110 at vertical intervals so that an airtight state of a coupling portion of the body 110 can be maintained.

A short jaw 115 may be formed at each of an upper end portion and a lower end portion of the body 110.

The short jaw 115 is formed at each of the upper end portion and the lower end portion of the body 110 so that a lower end of the coupling ring 150 comes into contact with the short jaw 115 of the upper end portion of the body 110, and as the coupling ring 150 is coupled to a prechamber 300, the lower end of the coupling ring 150 presses the short jaw 115 formed at the upper end portion of the body 110 and can be fixed within the prechamber 300 and the short jaw 115 of the lower end portion of the body 110 comes into contact with an upper end of the spacer 160 and as the body 110 is fixed, the spacer 160 can be fixed to the body 110.

Meanwhile, a through hole 111 may be provided in a center of an inner side of the body 110 and may extend from upward to downward.

The through hole 111 is provided in the center of the inner side of the body 110 to extend from upward to downward so that the spindle 120 can be inserted into the inner side of the body 110.

The spindle 120 perpendicularly penetrates the body 110, and a neck-down portion 121 having a smaller diameter than diameters of other portions is provided on an outer surface placed below the fuel flow hole 112.

The spindle 120 may be integrally formed.

The spindle 120 is integrally formed so that the number of parts can be minimized.

Meanwhile, an O-ring 122 may be provided at an upper end portion of the spindle 120 to contact an inner surface of the through hole 111 of the body 110.

The O-ring 122 is provided at the upper end portion of the spindle 120 to contact the inner surface of the body 110 so that an airtight state between an outer surface of the spindle 120 and the inner surface of the through hole 111 of the body 110 can be maintained.

The spring 130 surrounds the upper end portion of the spindle 120.

Since the spring 130 may be a conventional spring that may be contracted or extend, a detailed description of a structure and an operation of the spring 130 will be omitted.

The spring seat 140 is used to fix the spring 130 that surrounds the upper end portion of the spindle 120 onto the spindle 120 and guides the spindle 120 in a vertical state.

The spring seat 140 may be coupled to the spindle 120 by coupling a split ring 141.

The spring seat 140 is coupled to the spindle 120 by coupling the split ring 141 so that the coupling of the spring seat 140 can be conveniently performed.

The coupling ring 150 is coupled to an upper end of the body 110 and is used to fix the body 110 to the prechamber 300.

A thread 151 may be formed on an outer surface of the coupling ring 150.

The thread 151 is formed on the outer surface of the coupling ring 150 so that the coupling ring 150 can be coupled to the prechamber 300 with thread engagement.

Meanwhile, an upper end portion of the coupling ring 150 may have a nut shape.

The upper end portion of the coupling ring 150 has the nut shape so that the rotation of the coupling ring 150 can be easily performed.

The spacer 160 is coupled onto a lower end of the body 110 and fixes the lower end of the body 110 that covers an outer edge of the spindle 120 to the prechamber 300.

The spacer 160 is placed between the body 110 and the prechamber 300.

Modes of the Invention

Assembly of the check valve 100 for injecting fuel illustrated in FIGS. 3 and 4 will now be described in detail.

The through hole 111 is provided in a center of the inner side of the body 110 to extend from upward to downward so that an upper end of the spindle 120 is inserted into the body 110 through a lower end of the through hole 111 and the spindle 120 can penetrate the body 110.

In this case, the spring 130 surrounds the upper end of the spindle 120 that penetrates the body 110.

Here, the spring 130 that surrounds the upper end of the spindle 120 may move on the spindle 120. However, since the spring seat 140 is coupled to the upper end of the spindle 120 after the spring 130 surrounds the upper end of the spindle 120, the spring 130 that surrounds the spindle 120 can be fixed.

In this case, coupling of the spring seat 140 and the spindle 120 is performed by coupling the split ring 141.

The spacer 160 is coupled to the lower end of the body 110.

In this case, the spacer 160 is first inserted into the prechamber 300, and then the body 110 to which the spindle 120 is coupled, is inserted into the prechamber 300 after the spacer 160 is inserted into the prechamber 300 so that the spacer 160 can be coupled to the lower end of the body 110.

The coupling ring 150 is coupled to the upper end of the body 110.

Since the thread 151 is formed on the outer surface of the coupling ring 150, when the coupling ring 150 is inserted into the upper end of the body 110 and the coupling ring 150 is rotated, the thread 151 on the outer surface of the coupling ring 150 engages with the prechamber 300 with the thread, is gradually lowered, and can be coupled to the upper end of the body 110.

In this case, since the lower end of the coupling ring 150 compresses the short jaw 115 of the upper end portion of the body 110, as the coupling ring 150 is coupled to the body 110, the body 110 placed within the prechamber 300 can be fixed within the prechamber 300, and as the lower end of the coupling ring 150 compresses the short jaw 115 of the upper end portion of the body 110, the short jaw 115 of the lower end portion of the body 110 compresses the upper end of the spacer 160 so that the spacer 160 can be fixed to the lower end of the body 110.

As described above, the check valve 100 for injecting fuel illustrated in FIGS. 3 and 4 includes a combination of a relatively small number of parts, such as the body 110, the spindle 120, the spring 130, the spring seat 140, the coupling ring 150, and the spacer 160. Thus, disassembly and assembly of the check valve 100 for injecting fuel can be conveniently performed within a short time.

Figure 5:
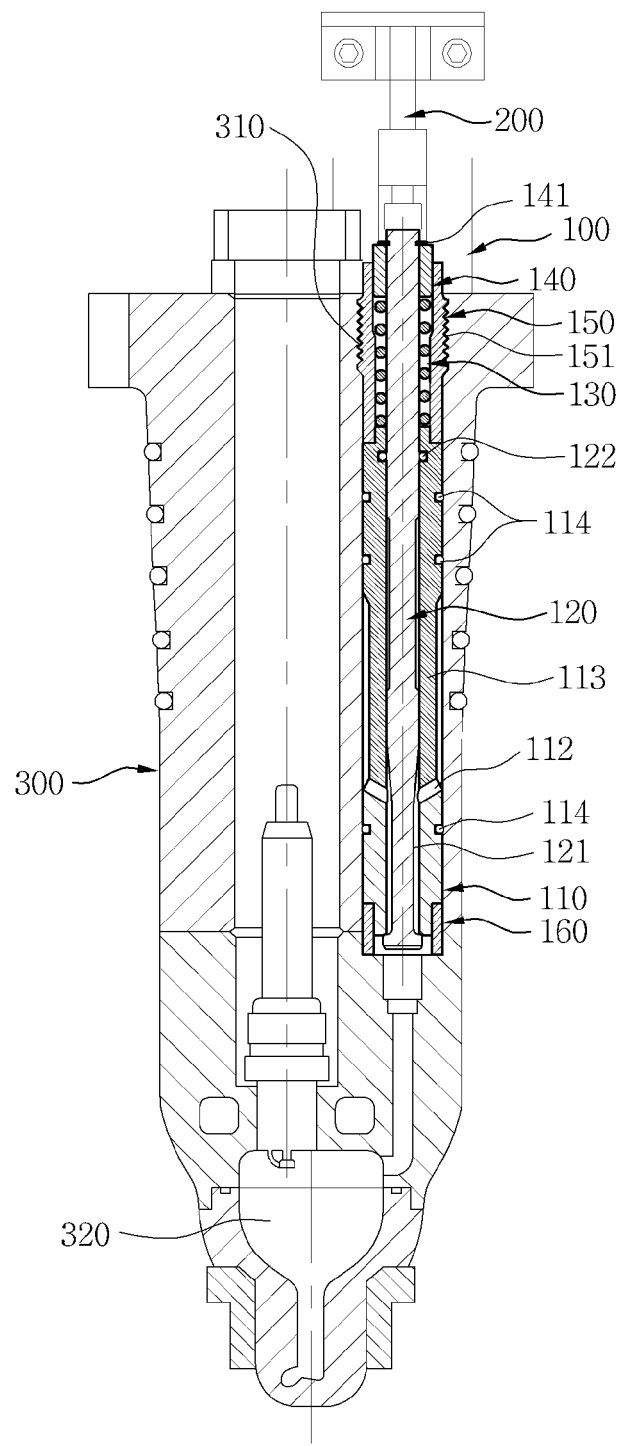
FIG. 5 is a view illustrating a usage state in which the check valve for injecting fuel of FIG. 3 is applied to a prechamber.

Meanwhile, the check valve 100 for injecting fuel illustrated in FIGS. 3 and 4, assembly of which is completed through the above procedures, injects fuel within the prechamber 300, as illustrated in FIG. 5.

A driving device 200 that is coupled onto a yoke 400 repeating vertical movements by driving a cam (not shown) and operates in a vertical direction, is provided in an upper portion of the prechamber 300.

The driving device 200 will now be described in detail.

Figure 9:
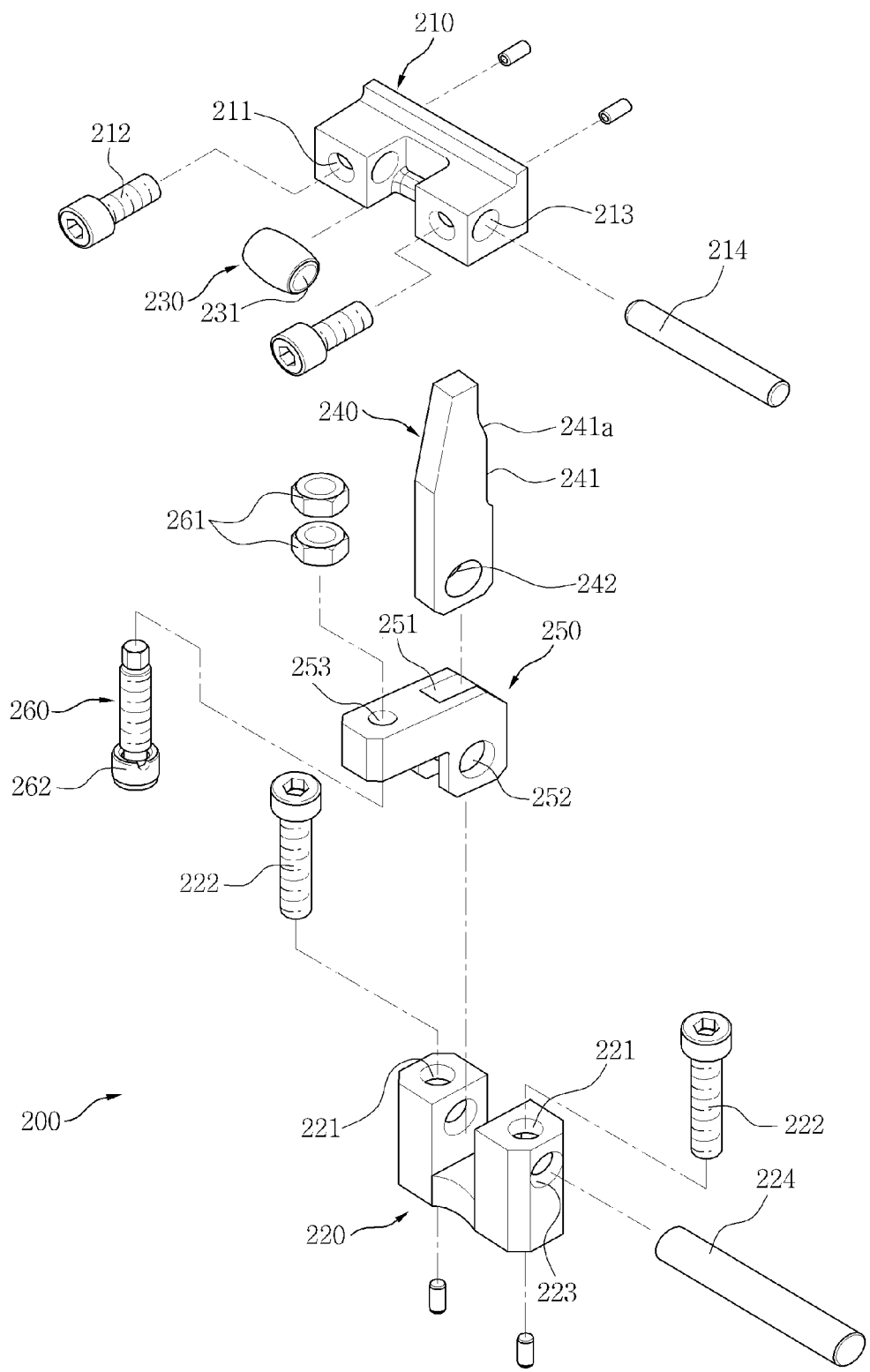
FIG. 9 is an exploded perspective view illustrating a structure of a device for driving the check valve for injecting fuel of FIG. 3.
Figure 10:
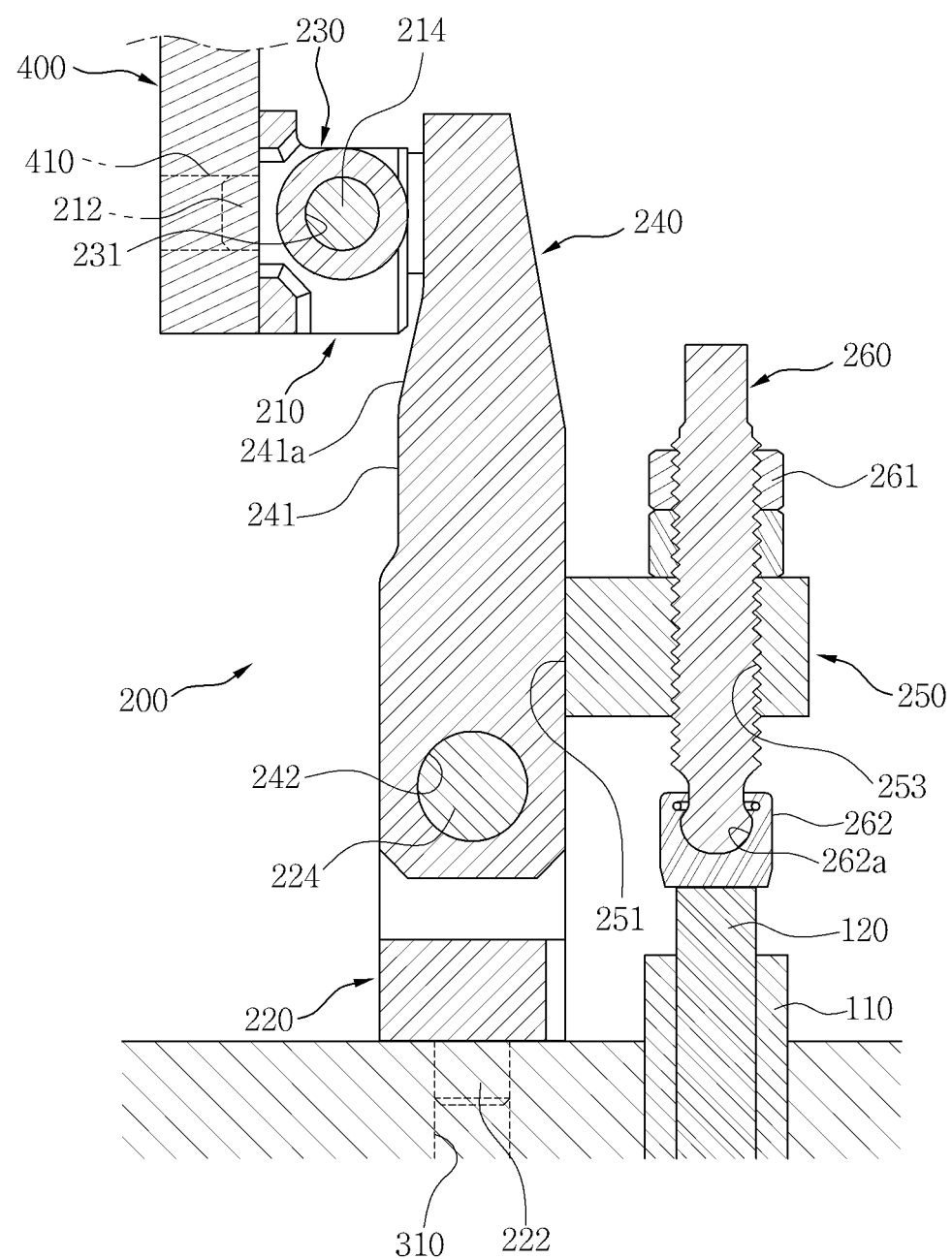
FIG. 10 is a cross-sectional view illustrating a coupled state for describing a structure of the device for driving the check valve for injecting fuel of FIG. 3.

As illustrated in FIGS. 9 and 10, the driving device 200 of the check valve 100 for injecting fuel according to an exemplary embodiment of the present invention includes an upper portion fixing block 210, a lower portion fixing block 220, a roller 230, a guide 240, an operation piece 250, and a pressing rod 260.

The upper portion fixing block 210 is coupled onto the yoke 400 that repeats vertical movements by driving the cam (not shown) and operates in a vertical direction.

Bolt coupling holes 211 may be provided in both sides of a front surface of the upper portion fixing block 210 and may extend backward.

The bolt coupling holes 211 are provided in both sides of the front surface of the upper portion fixing block 210 to extend backward so that bolts 212 are coupled onto the upper portion fixing block 210 through the bolt coupling holes 211 in a state in which the bolt coupling holes 211 of the upper portion fixing block 210 and bolt coupling holes 410 formed in the yoke 400 are placed in the same line and the upper portion fixing block 210 can be coupled onto the yoke 400.

A through hole 213 may be provided in a side of the upper portion fixing block 210 and may extend sideward.

The through hole 213 is provided in the side of the upper portion fixing block 210 to extend sideward so that the roller 230 can be rotatably coupled onto the upper portion fixing block 210 by inserting a pin 214 into the upper portion fixing block 210 through the through hole 213.

The lower portion fixing block 220 is coupled to the prechamber 300 at a lower portion of the yoke 400 to which the upper portion fixing block 210 is coupled.

Bolt coupling holes 221 may be provided in both sides of a top surface of the lower portion fixing block 220 and may extend downward.

The bolt coupling holes 221 are provided in both sides of the top surface of the lower portion fixing block 220 to extend downward so that bolts 222 are coupled onto the lower portion fixing block 220 through the bolt coupling holes 221 in a state in which the bolt coupling holes 221 of the lower portion fixing block 220 and bolt coupling holes 310 formed in a top surface of the prechamber 300 are placed in the same line and the lower portion fixing block 220 can be coupled onto the prechamber 300.

A through hole 223 may be provided in a side of the lower portion fixing block 220 and may extend sideward.

The through hole 223 is provided in the side of the lower portion fixing block 220 to extend sideward so that the guide 240 and the operation piece 250 can be rotatably coupled onto the lower portion fixing block 220 by inserting a pin 224 into the lower portion fixing block 220 through the through hole 223.

The roller 230 is rotatably coupled onto the upper portion fixing block 210, and a diameter of a center portion of the roller 230 is larger than diameters of both end portions of the roller 230.

The diameter of the center portion of the roller 230 is larger than the diameters of both end portions of the roller 230 so as to minimize a contact surface formed when the roller 230 and the guide 240 contact each other. As the diameter of the center portion of the roller 230 is larger than the diameters of both end portions of the roller 230, the roller 230 and the guide 240 come into point contact with each other such that abrasion of the roller 230 and the guide 240 can be minimized.

Meanwhile, a penetration hole 231 may be provided in a side of the roller 230 and may extend sideward.

The penetration hole 231 is provided in the side of the roller 230 to extend sideward so that the pin 214 that is coupled onto the upper portion fixing block 210 can penetrate the upper portion fixing block 210 through the penetration hole 231 and the roller 230 can be rotated on the upper portion fixing block 210.

The guide 240 is rotatably coupled onto the lower portion fixing block 220 and is rotated when a curved surface 241 on one side of the guide 240 comes into contact with the roller 230 that moves vertically.

An inclination portion 241a may be provided at the curved surface 241 of the guide 240.

The inclination portion 241a is provided at the curved surface 241 of the guide 240 so that the rotation of the guide 240 can be gradually performed while the roller 230 proceeds along the inclination portion 241a.

Meanwhile, a penetration hole 242 may be provided in a side of the guide 240 and may extend sideward.

The penetration hole 242 is provided in the side of the guide 240 to extend sideward so that the pin 224 that is coupled onto the lower portion fixing block 220 can penetrate the lower portion fixing block 220 through the penetration hole 242 and the guide 240 can be rotated on the lower portion fixing block 220.

The operation piece 250 is rotatably coupled onto the lower portion fixing block 220, and a front end of the operation piece 250 moves vertically in accordance with the rotation of the guide 240.

An uneven groove 251 may be provided behind the operation piece 250 and may extend downward.

The uneven groove 251 is provided behind the operation piece 250 to extend downward so that the guide 240 can be inserted into an inner side of the operation piece 250 through the uneven groove 251.

A penetration hole 252 may be provided in a side of the operation piece 250 and may extend sideward.

The penetration hole 252 is provided in the side of the operation piece 250 to extend sideward so that the pin 224 that is coupled onto the lower portion fixing block 220 can penetrate the lower portion fixing block 220 through the penetration hole 252 and the operation piece 250 can be rotated on the lower portion fixing block 220.

A hole 253, of which an inner circumferential surface is formed as a thread, may be provided in a front end of the operation piece 250.

The hole 253, of which the inner circumferential surface is formed as the thread, is provided in the front end of the operation piece 250 so that the pressing rod 260 engages with the operation piece 250 with the thread through the hole 253 and can be coupled to the operation piece 250.

The pressing rod 260 is coupled to the front end of the operation piece 250 and lowered in accordance with the lowering of the front end of the operation piece 250 so as to compress the upper end of the spindle 120 of the check valve 100 for injecting fuel.

A thread may be formed on an outer surface of the pressing rod 260.

The thread is formed on the outer surface of the pressing rod 260 so that the pressing rod 260 and the hole 253 of the operation piece 250 can engage with each other with the thread and the pressing rod 260 can be coupled onto the operation piece 250.

A double nut 261 may be coupled to an upper end of the pressing rod 260.

The double nut 261 is coupled to the upper end of the pressing rod 260 so that the pressing rod 260 can be prevented from flowing on the operation piece 250 and a degree of protrusion of the pressing rod 260 from the operation piece 250 can be adjusted by adjusting a height of coupling of the double nut 261.

In this case, a lower end portion of the pressing rod 260 may move forward, backward, right, and left.

The lower end portion of the pressing rod 260 moves forward, backward, right, and left so that, when the lower end portion of the pressing rod 260 compresses the upper end of the spindle 120, the pressing rod 260 and the spindle 120 come into close contact with each other by movement of the lower end portion of the pressing rod 260 and the spindle 120 can be smoothly compressed by the pressing rod 260.

In this case, forward, backward, right, and left movements of the lower end portion of the pressing rod 260 can be performed when the lower end of the pressing rod 260 has a hemispherical shape and a compression member 262 in which an accommodation groove 262a corresponding to the hemispherical shape is formed, is coupled to the lower end of the pressing rod 260 having the hemispherical shape.

Since the driving device 200 comes into contact with the upper end of the spindle 120, vertical movements of the spindle 120 can be repeatedly performed on the body 110 by repeating vertical movements of the driving device 200.

That is, when a front end of the driving device 200 is lowered, the upper end of the spindle 120 that penetrates the body 110 is compressed, and the spring 130 of the upper end of the spindle 120 is compressed, and the spindle 120 is lowered. When the front end of the driving device 200 is raised, the spring 130 that is compressed in the previous lowering procedure extends, and the spindle 120 is raised.

When the spindle 120 is lowered while it repeats vertical movements with the driving device 200 illustrated in FIGS. 9 and 10, fuel is injected into a precombustion chamber 320 of the prechamber 300.

Figure 6:
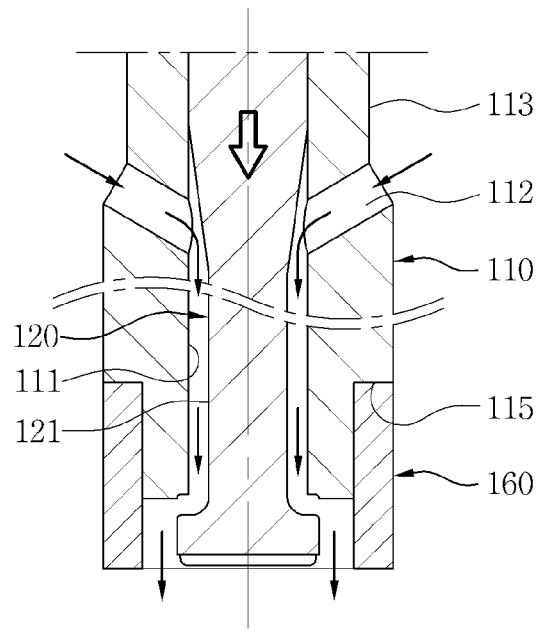
FIG. 6 is a view illustrating an operation state for describing lowering of a spindle of the check valve for injecting fuel of FIG. 3.

Since the fuel flow hole 112 is provided in the body 110, when the spindle 120 is lowered, as illustrated in FIG. 6, the fuel flow hole 112 that extends to an inner side of the through hole 111 is open, and fuel flows into the body 110.

Fuel that flows into the body 110 proceeds along the neck-down portion 121 provided on the outer surface of the spindle 120.

In this case, since the lower end of the spindle 120 protrudes toward the lower end of the body 110, the through hole 111 of the lower end of the body 110 is open, and fuel can be discharged through the open through hole 111 of the lower end of the body 110 so that fuel injection can be performed into the precombustion chamber 320.

Here, since the neck-down portion 113 provided on an outer surface of an upper portion of the fuel flow hole 112 of the body 110 has a diameter smaller than other areas of the body 110, a space is formed in the vicinity of the neck-down portion 113 so that fuel flow can be activated in the vicinity of the fuel flow hole 112 and injection of fuel can be more smoothly performed.

Since the neck-down portion 121 of the spindle 120 has a diameter smaller than other areas of the spindle 120, a space is formed between an outer surface of the neck-down portion 121 and an inner surface of the through hole 111 of the body 110 so that compressed fuel is waited in the space and injection of fuel can be more smoothly performed when the spindle 120 is lowered.

In the check valve 100 for injecting fuel illustrated in FIGS. 3 and 4, uncombusted fuel can be prevented from flowing backward while the above-described fuel injection procedure is performed.

This will now be described in detail.

Figure 7:
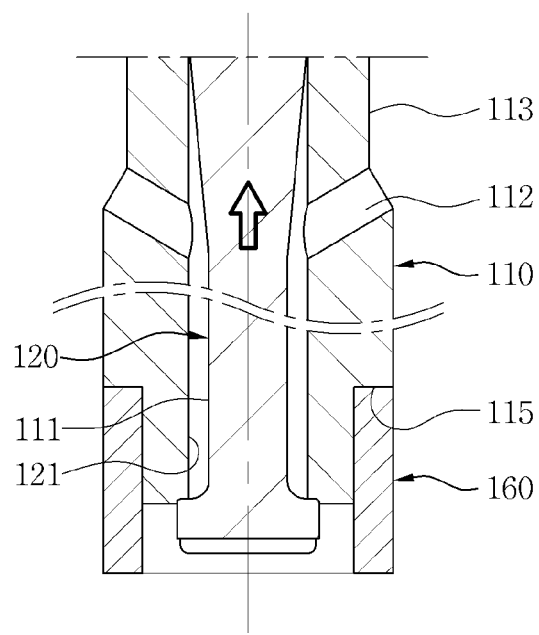
FIG. 7 is a view illustrating an operation state for describing raising of the spindle of the check valve for injecting fuel of FIG. 3.

When the driving device 200 is raised, the spindle 120 is raised in its pre-lowering state by extending the spring 130 that is contracted, as illustrated in FIG. 7.

Thus, when the spindle 120 is raised, the lower end portion of the spindle 120 closely contacts a circumference of the through hole 111 of the lower end of the body 110 and blocks opening of the through hole 111 so that uncombusted fuel can be prevented from flowing backward through the through hole 111.

Figure 8:
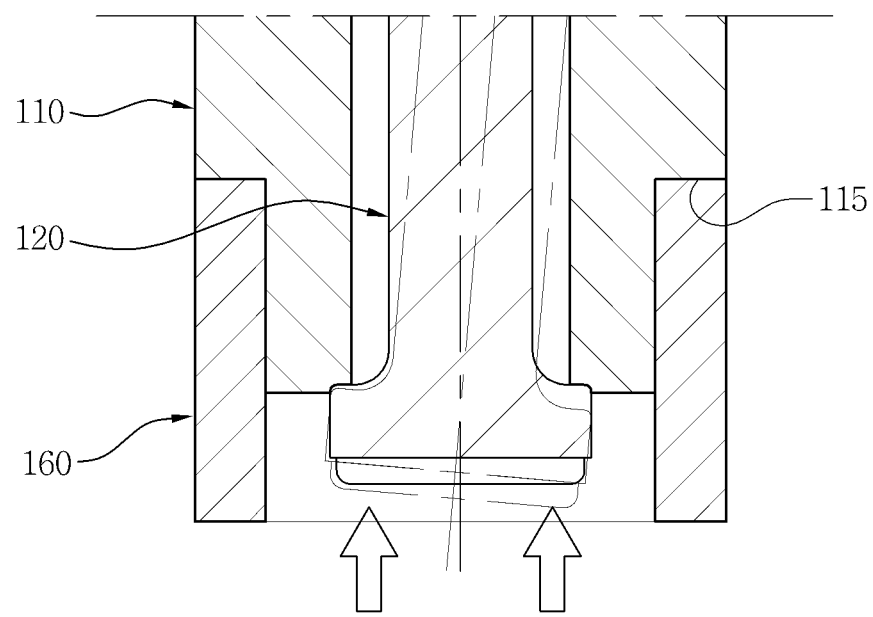
FIG. 8 is a view illustrating prevention of backflow of uncombusted fuel of the check valve for injecting fuel of FIG. 3.

In this case, since the short jaw 115 is formed on the lower end portion of the body 110, as illustrated in FIG. 8 and the spacer 160 is provided at a circumference of the short jaw 115 so as to support the lower end of the body 110, twisting of the body 110 is prevented, and no deformation occurs in the lower end portion (check valve seat portion) of the spindle 120 so that uncombusted fuel can be prevented from flowing backward through a gap of the deformed lower end portion of the body 110.

Furthermore, in the present invention, as the spindle 120 is coupled to the split ring 141, the spindle 120 is coupled to the spring seat 140, and a circumference of an outer surface of the spring seat 140 contacts the inner surface of the coupling ring 150. Thus, even when the driving device 200 for driving the check valve 100 is raised or lowered on a one-sided axis, the driving device 200 is supported by a contact portion between the outer surface of the spring seat 140 coupled to the spindle 120 and the inner surface of the coupling ring 150, and the spindle 120 is perpendicularly raised or lowered. Thus, one-sided abrasion of a guide surface of the spindle 120 can be prevented so that durability of the check valve 100 can be improved, and one-sided abrasion of the lower end portion (check valve seat portion) of the spindle 120 that contacts the lower end of the through hole 111 of the body 110 can be prevented so that uncombusted fuel can be prevented from flowing backward through a one-sided gap of the lower end portion of the spindle 120.

As described above, in the check valve 100 for injecting fuel illustrated in FIGS. 3 and 4, the neck-down portions 113 and 121 are provided on the outer surface of the body 110 and the outer surface of the spindle 120. Thus, the neck-down portion 113 on the outer surface of the body 110 provides a fuel flow space so that fuel injection can be smoothly performed.

In the check valve 100 for injecting fuel illustrated in FIGS. 3 and 4, the body 110 and the spindle 120 are individually integrally formed so that the number of parts can be minimized, disassembly and assembly can be conveniently performed within a short time, and thus productivity can be improved.

In the check valve 100 for injecting fuel illustrated in FIGS. 3 and 4, deformation (twisting) of the lower end portion of the body 110 is prevented by the spacer 160 so that uncombusted fuel can be prevented from flowing backward due to deformation of the lower end portion of the body 110.

In the check valve 100 for injecting as illustrated in FIGS. 3 and 4, even when the driving device 200 is raised or lowered on the one-sided axis, the driving device 200 is supported by the contact portion between the outer surface of the spring seat 140 and the inner surface of the coupling ring 150 so that the spindle 120 is perpendicularly raised or lowered. Thus, one-sided abrasion of the guide surface of the spindle 120 can be prevented so that durability of the check valve 100 can be improved.

While the invention has been shown and described with reference to certain exemplary embodiments thereof, it will be understood by those skilled in the art that various changes in form and details may be made therein without departing from the spirit and scope of the invention as defined by the appended claims.

INDUSTRIAL APPLICABILITY

A check valve for injecting fuel according to the embodiment of the present invention enables improved durability, improved productivity, smooth fuel injection, and prevention of backflow of uncombusted fuel and thus can be applied to a device, such as an engine for supplying fuel gas.

The invention claimed is:

1. A check valve for injecting fuel, comprising:
an elongate body having a through-hole formed along a longitudinal direction of the body, wherein a first neck-down portion having an outer diameter smaller than other areas is formed at an intermediate portion of the body in the longitudinal direction thereof, and a fuel flow hole is formed at the first neck-down portion;
a coupling ring coupled to an upper end of the body, wherein the coupling ring is configured to fix the body to a prechamber;
a coil spring installed inside the coupling ring;
an elongate spindle slidably installed inside the through-hole of the body and inside the coil spring in the coupling ring, wherein a second neck-down portion having an outer diameter smaller than other areas is formed at a lower end portion of the spindle;
a spring seat inserted into an annular gap formed between an upper end portion of the spindle and an upper end portion of the coupling ring, wherein the spring seat is fixed with the upper end portion of the spindle and slidable with the spindle inside the upper end portion of the coupling ring; and
a spacer, which is coupled to a lower end of the body, for fixing the lower end of the body that covers an outer edge of the spindle to the prechamber,
wherein an O-ring is provided in the upper end portion of the spindle to contact an inner surface of the through hole of the body.

2. The check valve of claim 1, wherein a short jaw is formed on an outer surface of each of an upper end portion and a lower end portion of the body.

3. The check valve of claim 1, wherein the spring seat is coupled to the spindle by coupling a split ring.

4. The check valve of claim 1, wherein a thread is formed on an outer surface of the coupling ring.

5. The check valve of claim 4, wherein the upper end portion of the coupling ring has a nut shape.

6. The check valve of claim 1, wherein an outer diameter of the spring seat is guided toward an inner diameter of the coupling ring.

7. The check valve of claim 1, wherein a lower end of the spacer is placed at a portion lower than a lower end of the spindle.

* * * * *